United States Patent [19]
Yamaguchi et al.

[11] Patent Number: 5,267,075
[45] Date of Patent: Nov. 30, 1993

[54] OPTICAL UNIT FOR USE IN LASER BEAM PRINTER APPARATUS

[75] Inventors: Masao Yamaguchi, Kawaguchi; Ken Omura, Tokyo, both of Japan

[73] Assignee: Kabushiki Kaisha Toshiba, Kawasaki, Japan

[21] Appl. No.: 855,520

[22] Filed: Mar. 20, 1992

[30] Foreign Application Priority Data

Jul. 15, 1991 [JP] Japan .................. 3-174105

[51] Int. Cl.$^5$ .............................. G02B 26/08
[52] U.S. Cl. .................... 359/216; 359/218
[58] Field of Search ............... 359/216, 217, 218, 219

[56] References Cited

U.S. PATENT DOCUMENTS

| | | | |
|---|---|---|---|
| 4,447,112 | 5/1984 | Matsuoka et al. | 359/218 |
| 4,523,801 | 6/1985 | Baba et al. | 359/218 |
| 4,643,516 | 2/1987 | Ogura | 359/218 |
| 4,715,699 | 12/1987 | Morimoto | 359/216 |
| 4,733,064 | 3/1988 | Ishikawa | 359/218 |
| 4,998,790 | 3/1991 | Iizuka et al. | 359/207 |
| 5,005,928 | 4/1991 | Suzuki et al. | 359/206 |
| 5,081,544 | 1/1992 | Kikuchi et al. | 359/217 |

FOREIGN PATENT DOCUMENTS

| | | |
|---|---|---|
| 0431603A3 | 6/1991 | European Pat. Off. . |
| 3922982A1 | 1/1990 | Fed. Rep. of Germany . |
| 2050122 | 2/1990 | Japan . |

*Primary Examiner*—Loha Ben
*Attorney, Agent, or Firm*—Foley & Lardner

[57] ABSTRACT

An optical unit includes a primary lens for converging a laser beam L emitted from a semiconductor laser element, a cylindrical lens for further converging the converged laser beam, and first and second plastic lenses having optical characteristics offsetting each other in at least one of first and second directions perpendicular to each other. By virtue of the primary lens and cylindrical lens, devices included in the optical deflector on the front side thereof can be made small, and also the arrangement of the lenses can be simplified. Devices of the same on the rear side thereof incorporate lenses including a planar surface, which reduces the required manufacturing cost.

18 Claims, 8 Drawing Sheets

OPTICAL UNIT FOR USE IN LASER BEAM PRINTER APPARATUS

BACKGROUND OF THE INVENTION

1. Field of the Invention

This invention relates to an optical unit for use in a laser beam printer apparatus, more particularly, to an optical unit having lenses and an optical deflector which guide a light beam to an object.

2. Description of the Related Art

An optical unit for use in a laser beam printer has in general semicond laser for generating light beams, a plurality of rotatable mirrors, an optical deflector for deflecting a light beam generated from the laser, and lenses for transforming, into light beams having a desired beam spot size, the light beam directly supplied from the laser and the light beam deflected by the deflector. The lenses are sorted into a first lens group, i.e., a pre-deflection-stage optical system and a second lens group, i.e., a post-deflection-stage system.

The first lens group is interposed between the optical deflector and laser, and includes a glass or a plastic lens for transforming the light beam supplied from the laser, into a parallel beam.

The optical deflector rotates the mirrors to thereby deflect the light beam toward the object or photoconductor.

The second lens group includes focusing lens for transforming the deflected light beam into a beam having a spot size most suitable for a laser beam printer apparatus, and an fθ lens for which an angle θ, at which the beam is continuously reflected by the mirrors of the deflector, is proportional to the position of the beam converged on the object in the main scanning direction.

The light beam generated from the laser is transformed into a parallel beam via the first lens group serving as a collimating lens, and then is deflected by the optical deflector in a desired direction, i.e., the light beam is reflected in accordance with rotation of the mirrors. The deflected light beam is transformed by the fθ lens and focusing lens, arranged in the second lens group, into a beam of a desired shape, which converges onto a desired surface portion of the photoconductor.

In the above-described optical unit, the laser is movable so that the center line of the light beam generated from the laser could be aligned with an optical axis defined between the laser and photoconductor. Further, at least one of the first and second lens groups incorporates a source-object adjusting mechanism for adjusting the length of an optical path between the laser and photoconductor.

The source-object adjusting mechanism is provided for causing the light beam from the laser to converge onto the photoconductor even when the beam spot size of the light beam is varied due to a change in the central portion of the laser, in the focal length of each lens, or in temperature or humidity. In general, a mechanism of this type includes a lens for first transforming a laser beam, which should be finally converged, into a parallel beam, and a lens for transforming the parallel beam into a converged beam. That is two or more lenses, which complimentarily act with one another, for example, they have the same power but opposite polarities, are provided between the laser and photoconductor, thereby accurately converging the laser beam onto the photoconductor.

However, if the lenses acting complementarily with one another are interposed between the laser and optical deflector, i.e., the first lens group, adjustment is necessary so as to accurately converge the laser beam onto the photoconductor, which makes it difficult to assemble the optical unit. Moreover, provision of complementary lenses inevitably makes the optical unit large.

An optical unit incorporating such complementary lenses, in which a laser beam is guided to a deflector after it is transformed into a parallel beam, is disclosed, for example, in U.S. Pat. Nos. 4,643,516 and 4,715,699.

SUMMARY OF THE INVENTION

It is an object of the invention to provide an optical unit which is easy to adjust a focal point at the time of assembly thereof.

It is another object to provide an optical unit of compact size having a stable optical characteristics, To attain the above objects, an optical unit includes: means for generating a light beam; first optical means, having a finite lens, for converting the light beam generated from the generating means; means for deflecting the light beam converted by the first optical means; and second optical means for focusing the light beam deflected by the deflecting means to a surface on a recording medium.

The laser beam generated from the laser is transformed into a beam converged in the sub and main scanning directions before it is deflected by the deflector. The converged laser beam is guided to the photoconductor through lenses having a power in only one of the main or sub scanning direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 6A and 6B show a change in the position of an image obtained by the structure shown in FIG. 5:

FIGS. 7A and 7B show a change in the position of an image obtained by the structure shown in FIG. 1:

DETAILED DESCRIPTION OF THE PREFERRED EMBODIMENTS

The invention will be explained with reference to the accompanying drawings showing an embodiment thereof.

Figure 1:
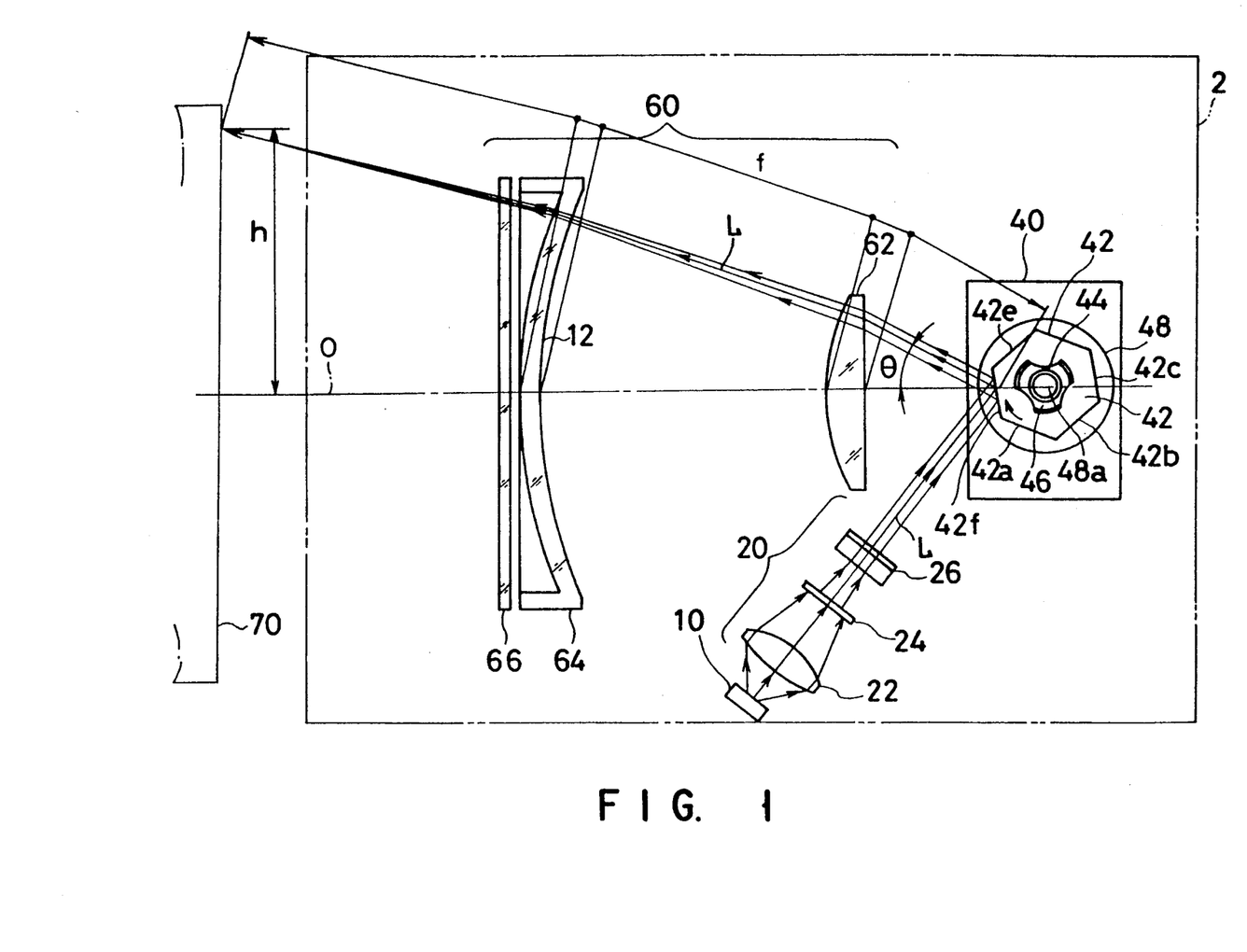
FIG. 1 is a schematic plan view, showing the optical path of an optical unit of the invention for use in a laser beam printer apparatus.
Figure 2A:
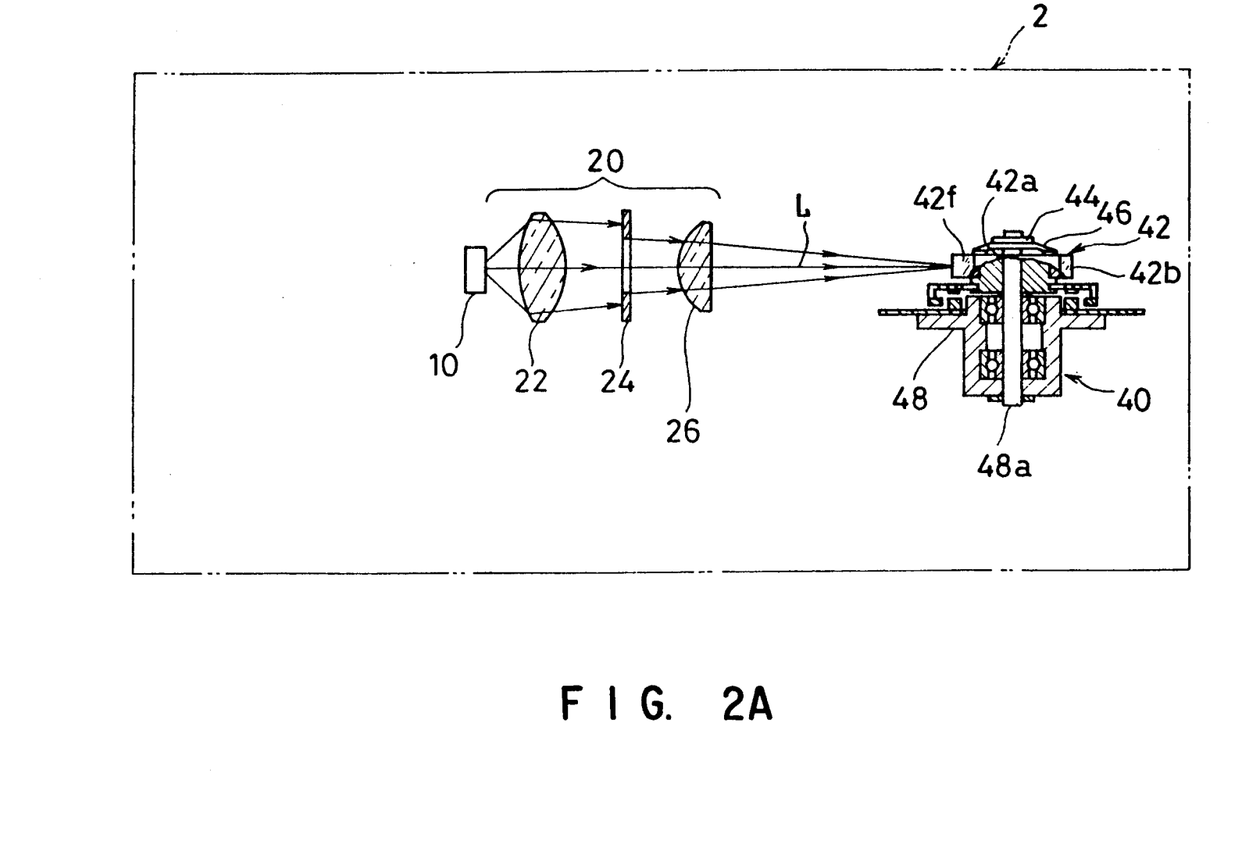
FIG. 2A is a sectional view, showing the optical path of a laser beam taken along an optical axis extending from a semiconductor laser employed in the unit of FIG. 1 to an optical deflector employed in the same, and also taken in a sub scanning plane perpendicular to a main-scanning plane.
Figure 2B:
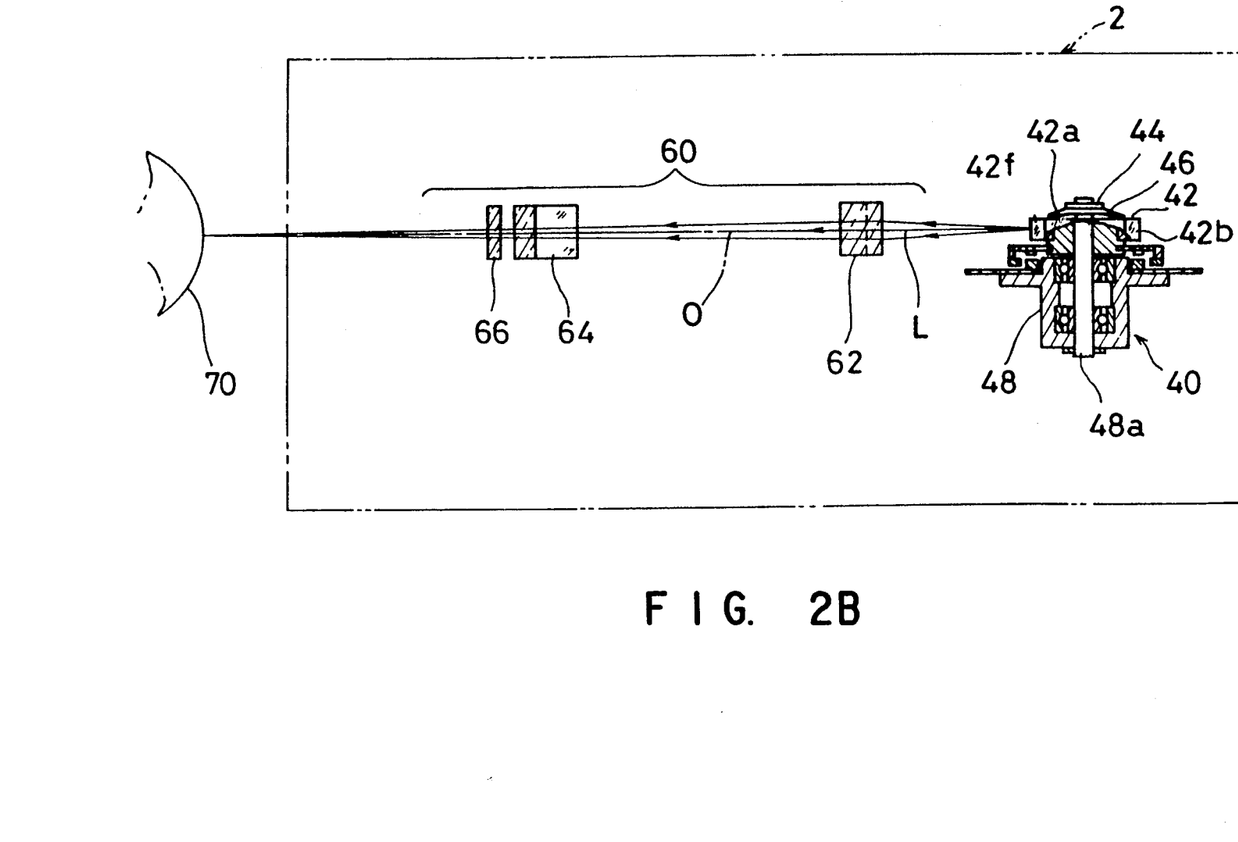
FIG. 2B is a sectional view, showing the optical path of the laser beam taken along an optical axis extending from the optical deflector to a photocell, and also taken in the sub-scanning plane perpendicular to the main-scanning plane.

As is shown in FIGS. 1-2B, the optical unit 2 includes a semiconductor laser element (i.e., light source) 10 for generating a light beam L to an object 70. The optical unit 2 contains a first lens group (i.e., first optical means) 20 being arranged after the laser element 10, having a plurality of lenses, for transforming the beam spot size of the laser beam L into a desired size. The optical unit 2 has an optical deflector 40, arranged between the first lens group 20 and the object 70, for deflecting the transformed beam L in a desired direction. The optical unit 2 further includes a second lens group (i.e., second optical means) 60 arranged between the deflector 40 and the object 70, having a plurality of lenses, for aligning the deflected beam L on a photoconductor (i.e., object) 70, and also for adjusting the beam spot size to a predetermined value. The optical unit 2 further contains a monitor optical unit (not shown) for monitoring horizontal synchronization of the laser beam L occurring in a main scanning direction in which the laser beam L is deflected toward the photoconductor 70 through the first and second lens groups 20 and 60.

Figure 3:
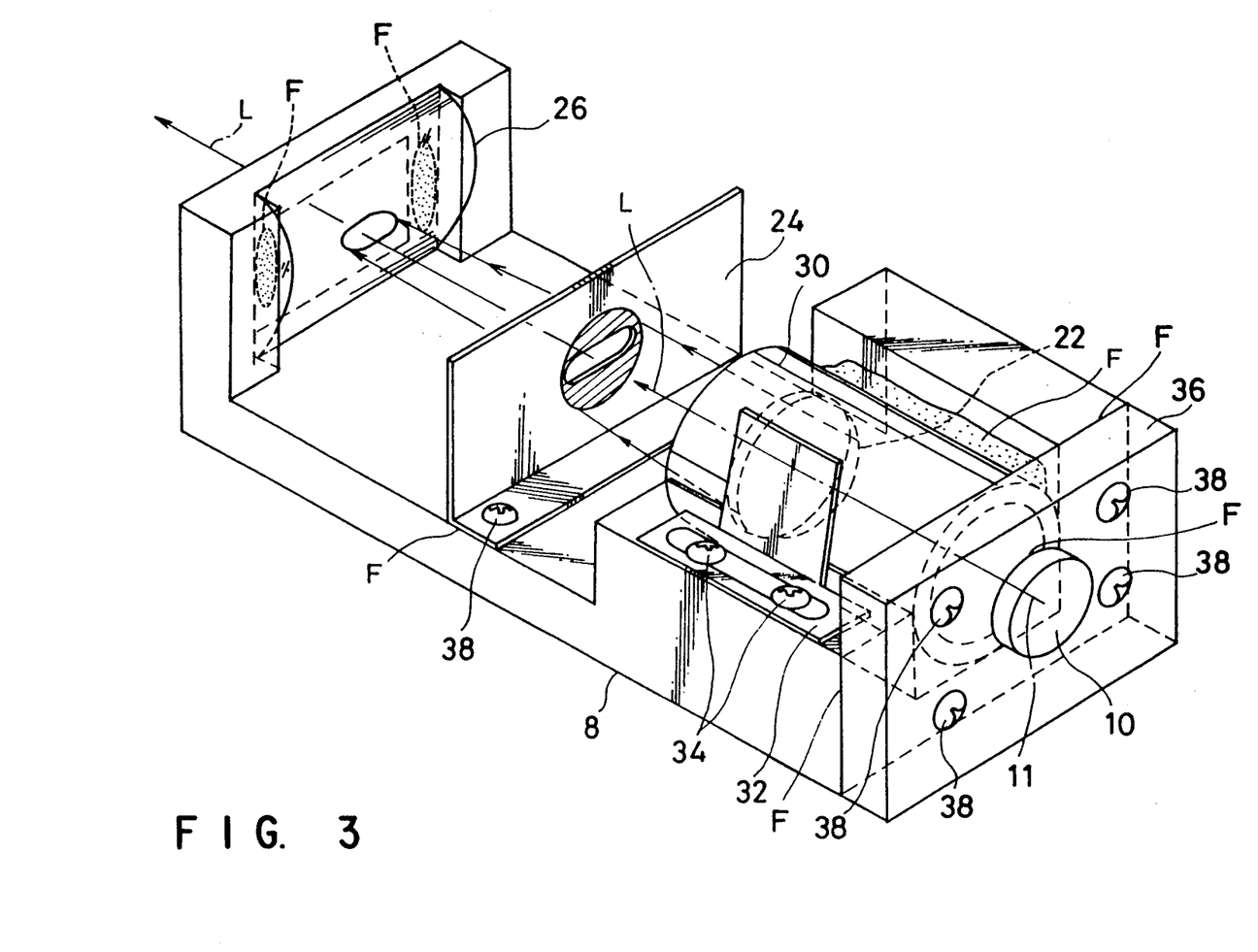
FIG. 3 is a perspective view, showing a structure fixing the semiconductor laser, a glass lens, and an aperture stop.
Figure 4:
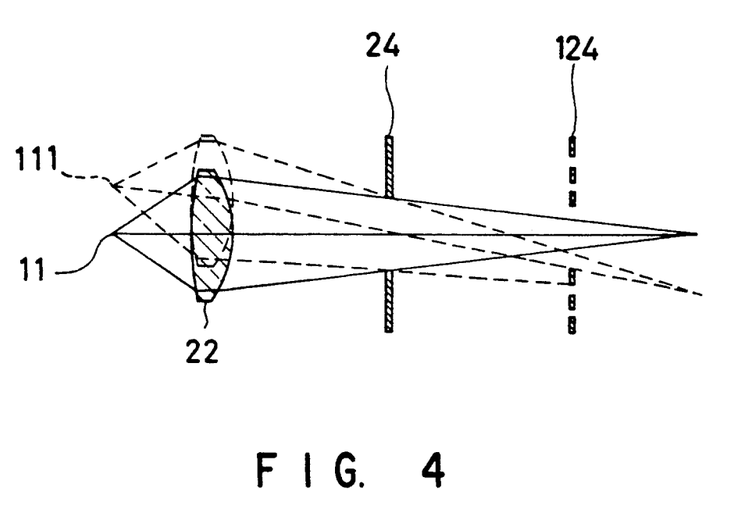
FIG. 4 is a schematic view, showing the relationship in the position of the glass lens and that of the aperture stop shown in FIG. 3.

The first lens group 20 has a primary lens 22 made from glass, e.g., BK 7, which has at least one aspherical plastic lens serving as light-entrance and/or light-outgoing surfaces, an aperture stop 24, and a secondary lens 26 arranged in the order mentioned. The primary lens 22 converges the laser beam L in the main or sub scanning direction with the same convergence ratio. The lens 22 is supported by a cylindrical lens barrel 30 secured to a lens housing 8, for example, as shown in FIG. 3. The aperture stop 24 is provided for keeping at a constant value the amount of the laser beam L supplied from the laser 10 to the photoconductor 70, and is secured at a location as shown in FIG. 4. The secondary lens 26 is a cylindrical lens having a convergence power in the sub scanning direction only, and is secured at a desired portion of the housing 8, as shown in FIG. 3.

The optical deflector 40 includes a polygonal mirror 42 having reflecting surfaces 42a–42f and a motor 48. The deflector 40 deflects toward the photoconductor 70 the beam L whose beam spot size is transformed into a desired one by the front optical section 20. Specifically, the beam L is continuously reflected at different angles in accordance with rotation of the polygonal mirror 42. The reflecting surfaces 42a–42f consist of planar mirrors having a high smoothness. The mirror 42 is secured to a shaft 48a of the motor 48 with a stop ring 44 and a leaf spring 46 interposed therebetween.

The second lens group 60 includes a first plastic lens (tertiary lens) 62, a second plastic lens (fourth lens) 64, and a dust-proof cover glass 66 enclosing the above-described deflector, lenses, mirrors, etc. The first and second plastic lenses 62 and 64 each have at least one planar surface, and form an achromatic structure therebetween. These lenses 62 and 64 in combination have a power for converging the beam L, which is converged by the second lens 26 in the sub scanning direction only, also in the main scanning direction by a convergence ratio, and have a power for aligning on the photoconductor 70 the beam L which moves in accordance with the rotation of the deflector 42, and adjusting the beam spot size to a predetermined size at all locations corresponding to every rotational angle $\theta$ of the reflecting surfaces 42a–42f of the deflector 42. In other words, curvatures of the lenses 62 and 64 are determined so as to satisfy the equation $h = f\theta$, where h represents a point of the light beam L which arrived at the photoconductor 70 (i.e., a distance between an optical axis 0 and the beam L on the photoconductor 70), and f the focal length of the combination structure of the lenses. In addition to the optical characteristic given by the equation $h = f\theta$, the lenses 62 and 64 have the following optical characteristics: the lens 62 has a curvature determined by a part of a circumference of a circle having a predetermined radius, and the lens 64 has such an optical characteristic as can offset the optical characteristic given to the beam L by the lens 62 (that is, the curvature of the lens 64 increases as the distance from the optical axis 0 increases). This means that the above-described powers are imparted to the lenses 62 and 64, respectively, and hence the lenses can be easily formed by molding. Further, in general, a mirror (not shown) is interposed between the second plastic lens 64 of the second lens group 60 and the photoconductor 70, for bending the laser beam L to thereby reduce the size of the image of the optical unit 2.

As is shown in FIG. 3, the first lens group 20 constructed on the lens housing 8 as one piece. The primary lens 22 is received in the lens barrel 30. The barrel 30 is secured to a desired portion of the housing 8 by being urged against one end of the housing with a pressing element 32 formed of an elastic member such as a copper plate, a phosphor bronze spring, or a stainless spring, etc. The lens barrel 30 can be slightly moved by means of a dedicated tool, not shown (such as a micro head apparatus). A clearance between the barrel 30 and the housing 8 is filled with an adhesive F. The secondary lens 26 is fitted in a depression formed in that predetermined portion of the housing 8 through which the optical axis of the primary lens 22 extends, and the laser beam L will pass, and is attached to the depression by means of the adhesive F. The laser 10 is fixed to the laser holder 36 by means of the adhesive F. The holder 36 is movable in the direction perpendicular to the optical axis 0, and is secured to the housing 8 after the laser 10 is aligned with the optical axis 0.

FIG. 4 shows the relationship between the primary lens 22 and aperture stop 24. In this figure, reference numeral 11 denotes the actual light-emission point of the laser 10, reference numeral 111 an imaginary light-emission point, and reference numeral 124 an imaginary position of the stop 24.

It is known that the amount of the beam L passing through the stop 24 will be greatly changed if the light-emission point is moved to the imaginary point 111. If the stop 24 is located in the imaginary point 124 (which differs from the rear focal point of the primary lens, 22), the amount of the beam L will be approximately half of that obtained in the actual case. If, on the other hand, the stop 24 is located in the rear focal point of the primary lens 22, the amount of the beam L will be kept at a constant value even if the light-emission point is moved.

Then, the movement of the laser beam L in the optical unit shown in FIGS. 1–4 will be explained.

The laser beam L output from the laser 10 is transformed into a converged beam by the primary lens 22, and is guided to the secondary lens 26 after it is restricted to have a predetermined size by the aperture stop 24. The secondary lens 26 is cylindrical, and has a convergence power for acting in the sub scanning direction. The power is determined so that the beam L will have a minimum beam spot size, i.e., a convergence point, on the mirror surfaces of the deflector 40 in the sub scanning direction.

The laser beam L, converged in the main scanning direction by the primary lens 22, is transformed by the secondary (cylindrical) lens 26 to converge also in the sub scanning direction, so as to have a minimum spot size on each mirror surface of the deflector 40.

The laser beam L, directed to the optical deflector 40, is reflected toward the first plastic lens 62 by the reflecting surfaces 42a–42f rotating at a constant angular speed.

Figure 5:
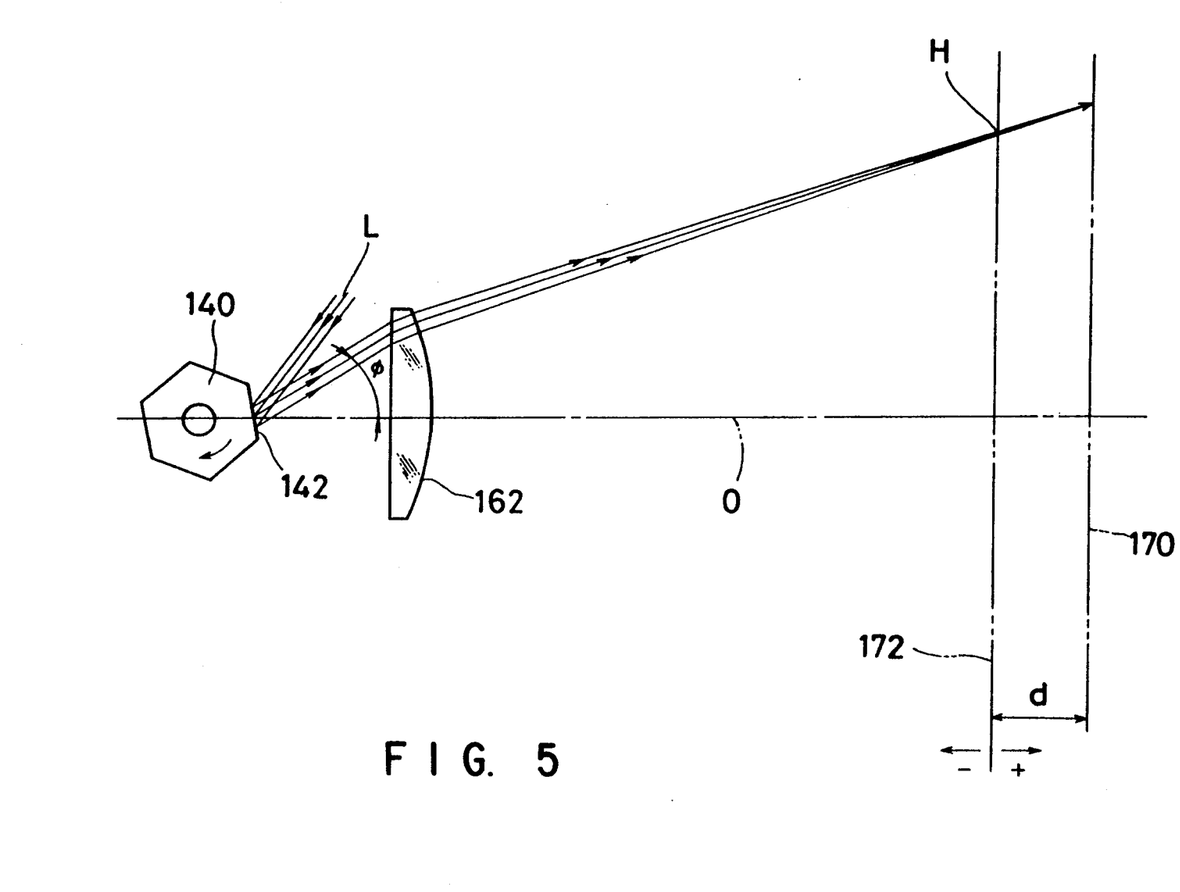
FIG. 5 is a schematic plan view, useful in explaining how the optical path extends between the deflector and photoconductor in a case where only a first plastic lens is used in the optical unit.

If a single lens 162 as shown in FIG. 5 is used to satisfy the equation h=fθ, (Note that "h" and "θ", which are shown in FIG. 1, are respectively indicated by "H" and "θ" in FIG. 5), that undesired characteristic aberrations, known as distortion or field curvature it difficult to obtain a minimum beam spot size, may increase under the following conditions; as the distance h from the optical axis 0 increases, or as the reflection angle of the laser beam L formed on the reflecting surfaces 42a–42f increases.

In a case where a beam L deflected by a planar mirror surface 142 of an optical deflector 140 is converged by means of the single lens 162, the deviation d between the actual destination position (a set of actual destination points H) 172 of the converged beam L (i.e., the actual destination points H in which the beam L has a predetermined spot size) and the position of the photoconductor 170 increases, as the angle θ formed between the optical axis 0, extending from the mirror surface 142 to the photoconductor 170, and the beam L deflected by the deflector increases. According the abovedescribed distortion and the degree of the field curvature increase (the actual destination position (the set of points H) 172 is shifted to the "−(minus)" side) increases as the angle θ increases. FIG. 5 shows a case where the actual destination position 172 is closer to the deflector than the position of the photoconductor 170.

In the invention, the distortion or field curvature is reduced by using the first and second plastic lenses 62 and 64 in combination (as is aforementioned, at least one of the light-entrance surface and light-outgoing surface of each of the lenses 62 and 64 comprises a flat surface, and the lenses in combination have an achromatic function).

FIGS. 6A, 6B, 7A, and 7B show optical characteristics of the lenses 62 and 64.

Figure 6A:
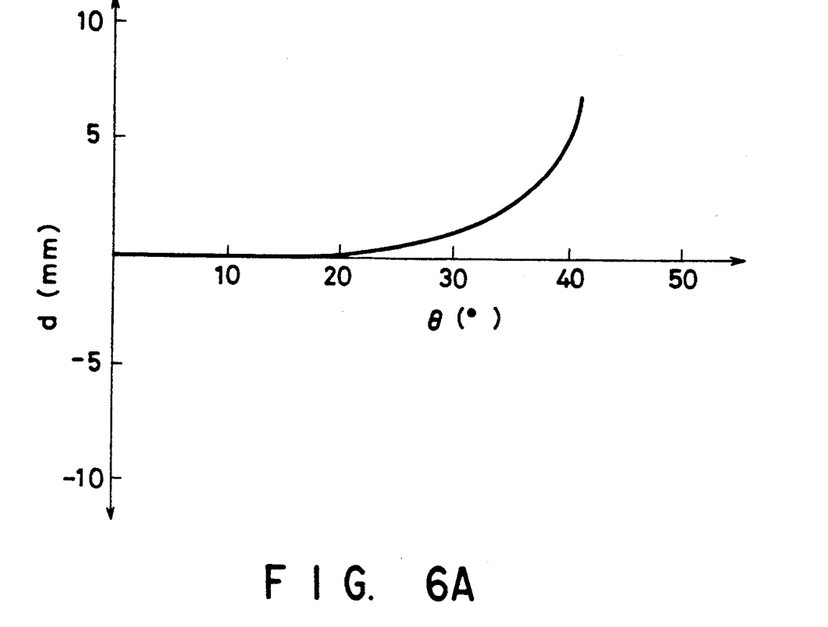
FIG. 6A is a graph, indicating a change in the distance between the optical deflector and the photoconductor.
Figure 6B:
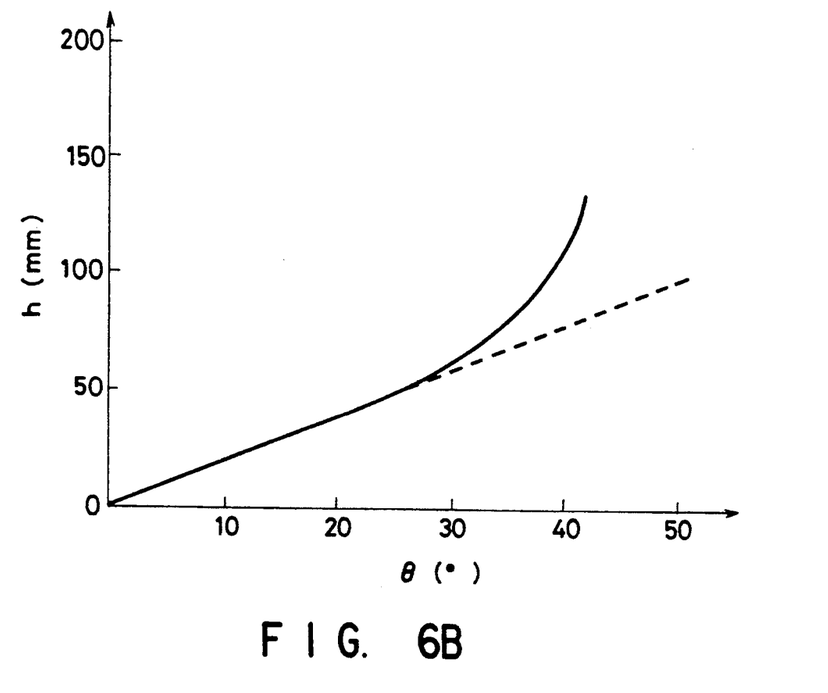
FIG. 6B is a graph, indicating a change in the $f\theta$ characteristic on the photoconductor.

As is shown in FIG. 6A, where only the plastic lens 62 is used for passing the laser beam L deflected by the rotating polygonal mirror 42, the deviation d of the actual destination position (note that, a distance from the position of the photoconductor 70) increases as the angle θ increases. Further, as is shown in FIG. 6B, the above-described fθ characteristic is increased as the angle θ increases. This means that the deviation of the actual destination position of the laser beam (i.e., one of the actual destination point H corresponding to the actual destination position 172 in FIG. 5) from the theoretical image-forming position determined by the equation h=fθ increases, and that the actual destination point H becomes larger than the theoretical destination point h (FIG. 1).

Figure 7A:
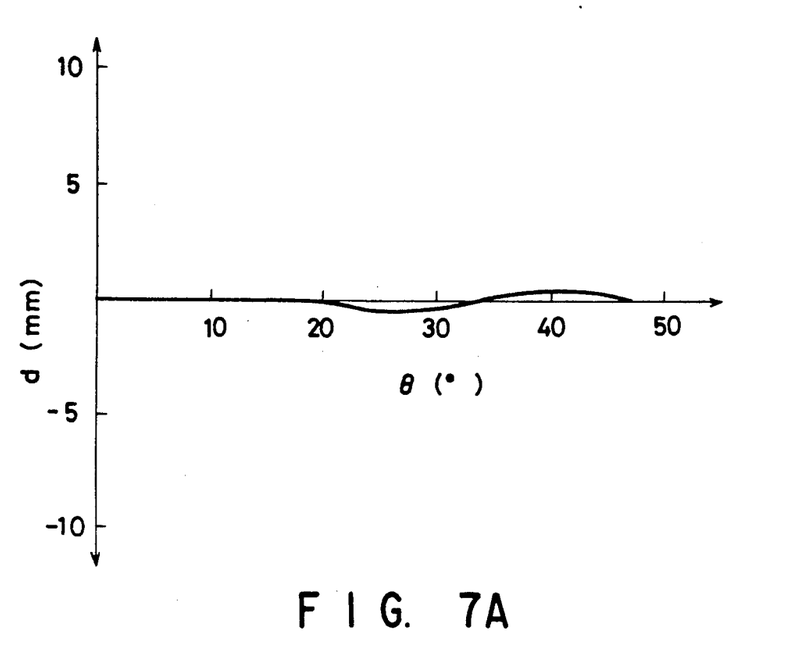
FIG. 7A is a graph, indicating a change in the distance between the optical deflector and the photoconductor.
Figure 7B:
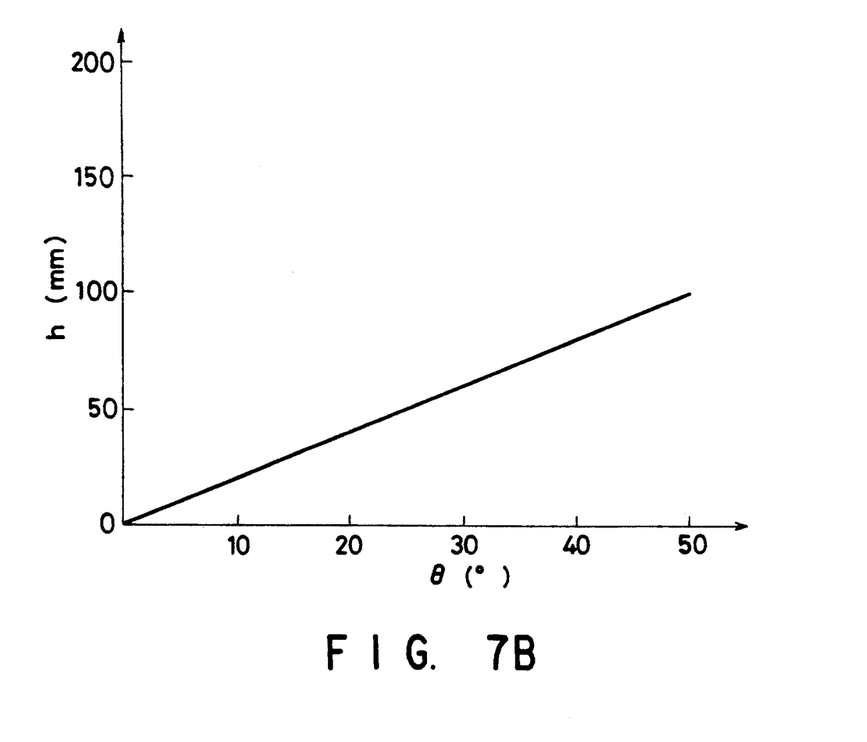
FIG. 7B is a graph, indicating a change in the $f\theta$ characteristic on the photoconductor.

As can be understood from FIG. 7A, the combination of the first and second plastic lenses 62 and 64 improves the optical characteristics shown in FIGS. 6A and 6B, that is, it enables the deviation d to be substantially 0. Further, as can be understood from FIG. 7B, the combination provides the fθ characteristic which enables the actual destination point H to be equal to the theoretical destination point h.

More specifically, the laser beam L reflected on the reflecting surfaces 42a–42f is adjusted by the first plastic lens 62 such that a) the angle θ at which the beam passes is proportional to a revolution of each surface 42a–42f in the vicinity of the optical axis 0 in the main scanning direction, so as to have a predetermined spot size on the photoconductor 70 irrespective of the revolution of one of the surface; and that b) the beam L is adjusted by the lens 62 at horizontal opposite end portions thereof to have an angle larger than the angle θ in the case of a) and to have a spot size larger than the predetermined size on the photoconductor 70 (i.e., the beam is transformed to converge into a point more remote from the lens 62 than the photoconductor 70, in other words, the laser beam L is supplied by the lens 62 with a relatively large field curvature and a relatively undesirable fθ characteristic.

The laser beam L is then guided to the second plastic lens 64, where the optical characteristics of the beam are kept as they are in the vicinity of the optical axis 0, and the beam passing the horizontal opposite ends of the lens 64 is bent in the main scanning direction by a sufficient power at an angle smaller than the case in the vicinity of the optical axis 0. As a result, the beam L passes substantially linearly between the lens 64 and photoconductor 70, and is converged onto a desired portion of the photoconductor 70 with the predetermined spot size.

Each time one scanning is performed in the main scanning direction, part of the beam L having passed the lens 64 is reflected toward a horizontal synchronization-detecting mirror (not shown), and is guided to a synchronization signal detector for detecting the horizontal synchronization of the beam L.

The photoconductor 70 is rotated by a driving apparatus (not shown) in a predetermined direction, and the beam L for forming an image to be output from the laser beam printer apparatus is continuously radiated onto the outer peripheral surface of the photoconductor 70. An exposed image obtained by radiating the beam L onto the photoconductor 70 is developed by visible image-forming means (not shown), and then copied on a copying medium.

Then, that spot size of the laser beam L which is obtained on the photoconductor 70 in a case where the second plastic lens 64 is arranged close to the photoconductor 70 will be explained.

Since the optical unit 2 shown in FIGS. 1-4 is used in a laser beam printer apparatus, etc., a fine powder such as a toner serving as the visible image-forming means for visualizing the laser beam L (exposed image) exists around the photoconductor 70. Accordingly, in the above case, the distance between the photoconductor 70 and second plastic lens 64 must be set to such a value as enables the beam L to be prevented from being diffused or diffracted by the toner even if the beam L has a sufficiently fine spot size, or enables the beam L to have a sufficient spot size even if the beam is interrupted by the toner.

The diameter of the toner is, in general, approx. 10-20 $\mu$m, so that it is preferable to restrict variations of energy within a range of approximately 15% or less. If the energy distribution of the beam spot has a Gaussian distribution, then the energy variations can be restricted at 15% or less. Thus, in the embodiment, the spot size of the beam L to be radiated onto the photoconductor 70 is set to 100-200 $\mu$m.

As is described above, in the invention, the laser beam generated from the semiconductor laser element is transformed into a beam having convergence in the main and sub scanning directions, before it is deflected by the deflector in a desired direction. The converged laser beam is guided to the photoconductor via a pair of lenses each having a convergence power in only one of the main and sub scanning directions. By virtue of this structure, it is easy to arrange the lenses so that they could transform the laser beam to have a desired spot size. The laser beam deflected by the optical deflector is further deflected by one of the lenses which is located upstream of the other, to advance at an angle $\theta$ proportional to the rotational angle of the optical deflector in the vicinity of the optical axis, and is then guided toward the photoconductor to have a desired spot size on the photoconductor. On the other hand, the laser beam, having passed through the horizontal opposite ends of the first lens, is deflected at an angle larger than the rotational angle of the optical deflector, and is guided toward the photoconductor having a spot size larger than the desired size on the photoconductor. Subsequently, the optical characteristics of the laser beam passing in the vicinity of the optical axis ar maintained as they are by the other of the lenses, while the laser beam passing the horizontal opposite ends of the other lens is deflected with a sufficient power thereof at a angle smaller than the rotational angle of the optical deflector. Accordingly, the laser beam, which has a predetermined spot size irrespective of the rotational angle of the polygonal mirror, is converged onto a desired portion of the photoconductor, and forms aligned images with the lapse of time.

The above-described structure utilizing planar surfaces as mirror surfaces facilitates the arrangement of the lenses.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical unit comprising:
   means for generating a light beam;
   first optical means, having a spherical glass lens and an aspherical plastic lens, for converging said light beam generated from said generating means in at least one direction perpendicular to a path along which said light beam travels before said light beam reaches an object to be scanned;
   means for deflecting said light beam converged by said first optical means; and
   second optical means for focusing said light beam deflected by said deflecting means to a surface on said object.

2. The optical unit according to claim 1, wherein said first optical means converges said light beam on a convergent point of a surface of said deflecting means.

3. The optical unit according to claim 2, wherein said second optical means focuses on said object said light beam which is deflected and diverges from said convergent point of said surface of said deflecting means.

4. The optical unit according to claim 1, wherein said deflecting means includes a plurality of planar mirror surfaces.

5. The optical unit according to claim 1, wherein said second optical means includes:
   a third lens for optically acting upon said light beam deflected by said deflection means and passing through a vicinity of an optical axis; and
   a fourth lens for acting upon that part of the light beam which passes through an end portion of said third lens.

6. The optical unit according to claim 5, wherein said third and fourth lenses further converge said light beam which has been converged by said first optical means.

7. An optical unit comprising:
   first optical means for converging a light beam at first and second convergence ratios in a first direction and a second direction perpendicular to said first direction, respectively including
      a spherical glass lens for converging said light beam at substantially the same ratio in said first and said second directions, and
      an aspherical plastic lens for further converging said light beam in only one of said first and second second directions before said light beam reaches an object to be scanned;
   means for deflecting said light beam having passed through said first optical means; and
   second optical means for further converging the deflected light beam onto said object at convergence ratios in said first and second directions different from said convergence ratios of said first optical means.

8. The optical unit according to claim 7, wherein said second lens has a cylindrical surface.

9. The optical unit according to claim 7, wherein said first optical means converges said light beam on a convergent point of a surface of said deflecting means.

10. The optical unit according to claim 9, wherein said second optical means focuses said light beam which is deflected and diverges from said convergent point of said surface of said deflecting means onto said object.

11. The optical unit according to claim 7, wherein said second optical means includes:

a third lens for optically acting upon said light beam deflected by said deflection means and passing through a vicinity of an optical axis; and a fourth lens for acting upon that part of said light beam which passes an end portion of said third lens.

12. The optical unit according to claim 11, wherein said third and fourth lenses further converge said light beam, which has been converged by said first optical means, in said first and second directions at said second and first convergence reactions, respectively.

13. The optical unit according to claim 11, wherein said third and fourth lenses serve as one lens, sand include at least one planar surface.

14. The optical unit according to claim 13, wherein said third and fourth lenses include at least one toric surface.

15. The optical unit according to claim 11, wherein said third and fourth lenses serve as one lens, and cause a deflection angle, at which said light beam is deflected, to be proportional to a distance between the optical axis and a point of the object where said light beam reaches said object.

16. An optical unit comprising:

first optical means having
- a first lens for converging a light beam in a first direction and a second direction perpendicular to said first direction at substantially the same convergence ratio, and
- a second lens for further converging the converged light beam at a convergence ratio different from that of said first lens in one of said first and second directions;

means for deflecting said light beam having passed through said first optical means; and second optical means having
- a third lens for optically acting upon said light beam deflected by said deflection means and having passed through the vicinity of an optical axis, and
- a fourth lens for acting upon that part of said light beam which does not pass through said third lens, said second optical means further converging the deflected light beam onto an object to be scanned at different convergence ratios in said first and second directions.

17. The optical unit according to claim 16, wherein:

said first lens is a converging lens, interposed between said light source and said deflecting means, for converging said light beam in all directions on a plane perpendicular to a direction in which said light beam passes;

said second lens is a cylindrical lens, interposed between said converging lens and said deflecting means, for further converging said light beam, converged by said converging lens, in only one of those two directions in said plane which are perpendicular to each other;

having said deflecting means includes rotatable planar mirror surfaces, for deflecting said light beam having passed through said cylindrical lens, by rotating said mirror surfaces in a direction perpendicular to said one direction in which said light beam has been further converged by said cylindrical lens;

said third lens, provided downstream of said deflecting means, increases the degree of the field curvature of said light beam on said object in a direction away from said mirror surfaces in accordance with increase in the amount of rotation of said mirror surfaces, and increases a distance between a point of the recording medium where said light beam reaches and the optical axis; and said fourth lens interposed between said third lens and said object, serves as substantially one lens together with said third lens, said fourth lens having regions with refraction factors which increase in accordance with an increase in the rotational angle of said mirror surface.

18. An optical unit comprising:

first optical means, having a first lens and a second lens, for converging a light beam at first and second convergence ration sin a first direction and a second direction perpendicular to said first direction, respectively;

means for deflecting said light beam having passed through said first optical means; and second optical means for further converging the deflected light beam onto an object at convergence rations in said first and second directions different from said convergence ratios of said first optical means, said second optical means including
- a third lens for optically acting upon said light beam deflected by said deflection means and passing through a vicinity of an optical axis, and
- a fourth lens for acting upon that part of said light beam which passes through an end portion of said third lens, wherein said third and fourth lenses further converge said light beam, which as been converged by said first optical means, in said first and second directions at said second and first convergence rations, respectively.

* * * * *